United States Patent [19]

Martin et al.

[11] Patent Number: 4,760,537
[45] Date of Patent: Jul. 26, 1988

[54] SYSTEM FOR ANALYZING LASER BEAM PROFILES

[75] Inventors: Frederick Martin, Menlo Park; John G. Willman, II, Santa Clara, both of Calif.

[73] Assignee: GTE Government Systems Corporation, Stamford, Conn.

[21] Appl. No.: 803,034

[22] Filed: Nov. 29, 1985

[51] Int. Cl.⁴ ............................................. G01R 23/00
[52] U.S. Cl. ...................................... 364/518; 364/521
[58] Field of Search .................. 364/518, 521, 487; 340/723, 724, 727, 720; 382/45–47, 49, 53, 54

[56] References Cited

U.S. PATENT DOCUMENTS

| | | | |
|---|---|---|---|
| 4,320,462 | 3/1982 | Lund | 364/525 |
| 4,399,512 | 8/1983 | Soma et al. | 364/521 X |
| 4,500,957 | 2/1985 | Hanamoto et al. | 364/518 X |
| 4,649,496 | 3/1987 | Anderson et al. | 364/518 X |
| 4,682,301 | 7/1987 | Horiba et al. | 382/54 X |

Primary Examiner—Gary V. Harkcom
Assistant Examiner—H. R. Herndon
Attorney, Agent, or Firm—Douglas M. Gilbert

[57] ABSTRACT

A two-dimensional image and energy profile of the output from a pulsed laser is analyzed on a pulse-by-pulse basis by a video graphics image processing system coupled to a minicomputer. An intensity distribution in psuedo color for the full beam is formed by the processor and displayed on a color monitor in real time. The minicomputer performs analytical measurements in two dimensions on the beam shape and size as well as on the pulse timing properties of the laser. The system serves as a real time diagnostic tool for laser development.

12 Claims, 4 Drawing Sheets

SYSTEM FOR ANALYZING LASER BEAM PROFILES

BACKGROUND OF THE INVENTION

1. Field of the Invention

The present invention relates to lasers and more particularly to apparatus for measuring the performance characteristics and other aspects of laser devices.

2. Description of the Prior Art

In many laser applications, precise measurements of laser beam energy profiles are essential to predict a laser's performance in a specific application. Typically, one needs to quantify the circular symmetry and intensity smoothness of a beam energy profile to an accuracy of better than 10% of the maximum beam intensity. Pulsed laers, as opposed to continuous (CW) lasers, are more difficult to analyze although the need is no less than with continuous lasers. Pulsed lasers, used in free space communication, radar applications and elsewhere, require quantitative data on a pulse-by-pulse basis so that pulse-to-pulse variations in the beam quality can be measured. Such data is useful, for example, in predicting error rates for laser communication applications or for the predicting the accuracy of a laser radar tracking system.

Traditionally, the spatial energy distribution in a laser beam (known as the laser beam profile) has been viewed visually or with burn patterns on photo sensitive paper. Although useful for many laser applications, these qualitative observations are inadequate for those applications requiring quantitative measurements of the beam profile of pulsed lasers. Linear line scanners, such as a reticon linear CCD (Charge Coupled Device) array, or various mechanical slit scanners, have been available to measure the continuous wave beam profile along a diameter of the beam. For two-dimensional measurements these line scanners require multiple scans to obtain a two-dimensional beam profile. However, for pulsed lasers this method does not provide an energy profile from a single laser pulse.

Thus it is an object of the present invention to provide a method of obtaining energy profile measurements of pulsed lasers.

It is a further object of the present invention to utilize a video camera with a two-dimensional CCD array sensor to measure laser beam profiles in two dimensions on a pulse-by-pulse basis, thus circumventing the limitations inherent in the prior art measuring techniques.

SUMMARY OF THE INVENTION

The present invention provides a system for measuring laser beam profiles in two dimensions on a pulse-by-pulse basis, the system comprising a video camera with a two-dimensional CCD array, a video graphics image processing system and a minicomputer for performing analytical calculations and data analysis from the video processor.

A video camera "reads" the laser beam profile in two dimensions by scanning in two interlaced fields a two dimensional CCD pixel array at a rate of 30 Hz. Each CCD pixel generates a voltage level proportional to the intensity of the light on that pixel. The electronics in the camera convert this sequence of pixel outputs to a standard RS 170 composite video signal. A video image graphic processing system converts this video signal into a corresponding sequence of digital data suitable for analysis by a minicomputer. Analysis of these data provides quantitative information on beam symmetry, uniformity, size and alignment. Pulsed lasers are synchronized to the video scan to ensure the arrival of the light pulse at the beginning of the video scan.

The system also has the capability of providing a qualitative real time visual display of the laser beam intensity profile. A pseudo color grey scale algorithm in the graphics processor encodes the laser beam intensity pattern and a visual monitor, driven by the graphic processing system, displays a colored image representing the intensity distribution for the laser beam enabling the quality of the laser beam to be optimized in real time.

The system of the present invention thus provides a tool for making precision measurements of beam profiles. In addition the system can make a number of ancillary measurements including measuring the scanning properties of a beam across a large field of view, pulse-to-pulse variations in the total energy of the beam over a large number of pulses, precision measurements in the timing of the laser beam pulses, and demodulation of the output from a laser transmitter.

BRIEF DESCRIPTION OF THE DRAWINGS

For a better understanding of the invention as well as other objects and further features thereof, reference is made to the following description which is to be read in conjunction with the accompanying drawings wherein.

DETAILED DESCRIPTION OF THE INVENTION

Figure 1:
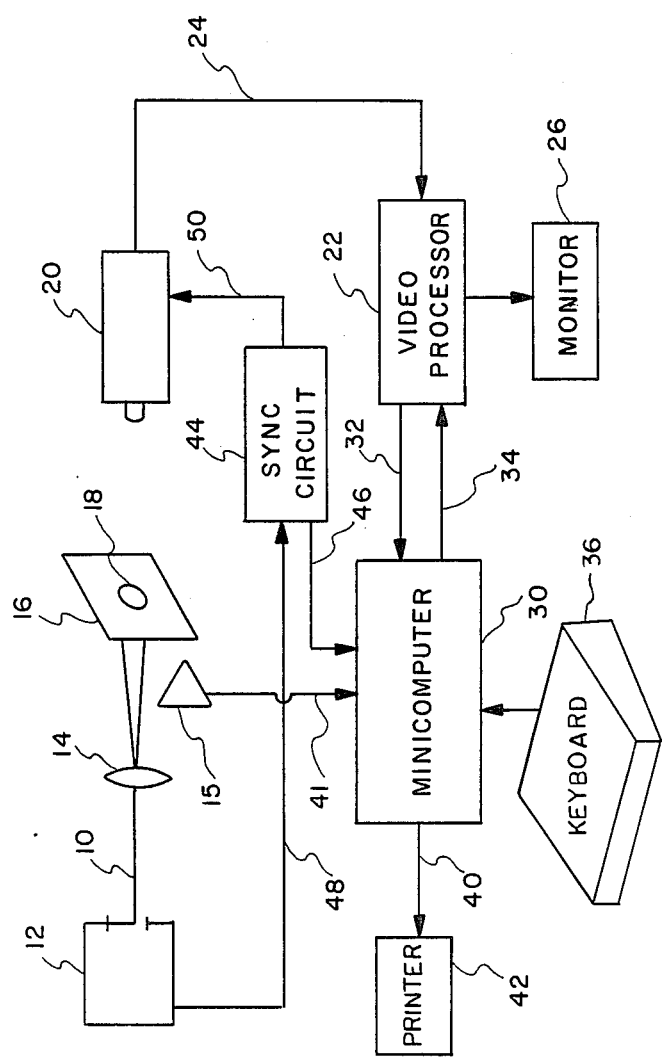
FIG. 1 is a general block diagram of the system of the present invention.

A simplified block diagram of the present invention is shown in FIG. 1. Laser device 12 generates a pulsed laser beam 10 which is expanded and focused by beam optics 14 onto a transmission screen 16. The laser beam forms a light image 18 on screen 16 which is scanned by video camera 20. The analog video output from camera 20 is connected to a video graphics processor 22 via path 24. Video graphics processor 22 digitizes the analog output and stores the signals for a single image in an internal memory. An analog output from the video processor 22 enables the operator to continuously view the scanned image 18 on color monitor 26. The digitized data is applied via 32 to minicomputer 30 for processing and analysis. The minicomputer 30, is preferably a DEC model LSI-11/23 PLUS minicomputer, available from Digital Equipment Corporation, Mayard, Mass., although other computer systems could be utilized. Minicomputer 30 is triggered by the laser 12 and the computer commands the video processor 22 to hold the image on display until the next laser pulse. Minicomputer 30, controlled via operator keyboard terminal 36 provides an output to printer 42 via path 40.

It is desirable, for quality beam intensity profile measurements, to have a video camera with good resolution, low geometric distortion, large dynamic range and uniform sensitivity across the image plane. A Fairchild CCD 3000 Video Communication Camera, available from Fairchild Corporation, Palo Alto, Calif. was found to satisfy these requirements and thus was used as camera 20 in the preferred embodiment, although other video cameras having similar characteristics could be utilized. A model 270 Grinnel Graphics Processor, now available from Comtal/3M Company—Image Processing Systems, 1111 South Arroyo Parkway, Pasadena, CA 91105 could be used as video processor 22 although other processors may be utilized.

The pulsed laser output 10 and the scan of camera 20 are synchronized with each other by an interface (sync) circuit 44. FIG. 1 shows an embodiment where the laser 12 triggers the camera 20 via paths 48 and 50 through sync cicuit 44 although the camera may trigger the laser under the right circumstances. A portion of the laser firing (trigger) pulse (on path 48) is directly applied to a "sync input" of camera 20 to initiate the video camera scan cycle. (There are some laser devices where this trigger pulse is unavailable, and in such situations the vertical retrace pulse from camera 20 can be used to trigger the firing of the laser. Sync circuit 44 can accommodate either application. Either technique ensures the arrival of the laser pulse at the beginning of the video scan.)

In operation, the video camera 20 converts the laser beam image 18 into an electrical signal by scanning in two dimensions, preferably in the standard TV interlaced format. The scanning format is an array of 488(H) by 380(W) CCD pixels at a scanning rate of 30 Hz in synchronization with the laser pulse. Each pixel in the video camera generates a voltage level proportional to the intensity of light on that pixel element. The camera converts this sequence of pixel outputs to a standard RS 170 composite video signal of 525 lines, two fields per frame, fully interlaced format with a resolution of 488 lines per frame by 380 elements per line.

The video image graphic processor 22 converts the sequence of analog pixel outputs on path 24 into a corresponding sequence of digital data signals suitable for analysis by minicomputer 30. Analysis of these data provides quantitative information on beam symmetry, uniformity, size and alignment. Comparisons of the beam shape with various theoretical shapes can be made by minicomputer 30. Pulsed laser 12 is synchronized to the video scan of camera 20 to ensure the arrival of the light pulse at the beginning of the video scan. This configuration limits the laser repetition rate to 30 Hz or less. Higher repetition rates may be achieved; for example, 60 Hz with an array of 240×380 CCD pixels is a standard option for video systems, although spatial resolution will be decreased.

Figure 2:
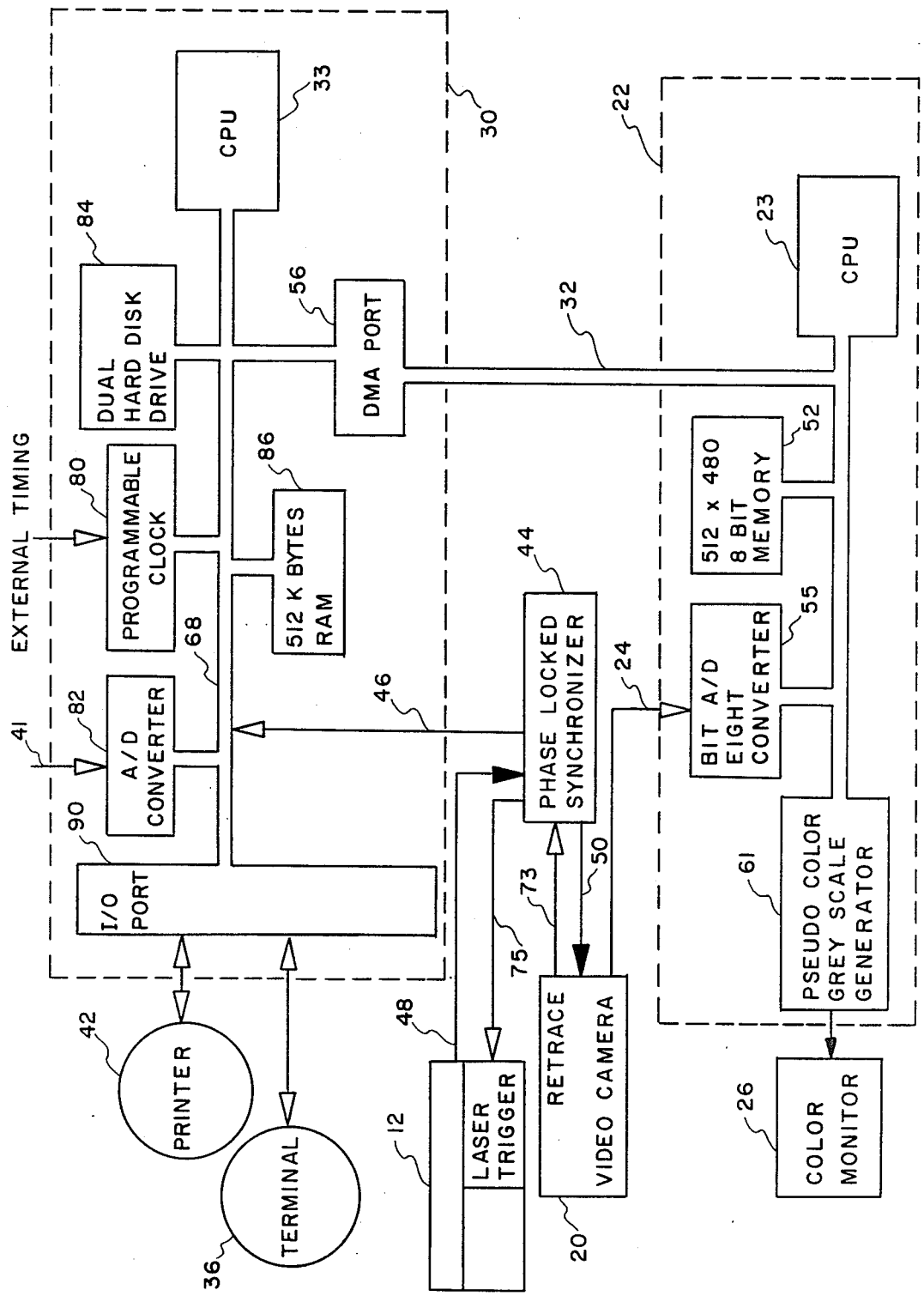
FIG. 2 is a detailed block diagram of the system of the present invention.

Referring now to the FIG. 2, the graphics processor 22 comprises a CPU 23, an eight-bit A/D converter 55, the eight-bit 512×480 memory device 52 and the pseudo-color grey scale generator 61. The flow of data commences at video camera 20 where two interlaced video fields (244×380) are generated at the rate of 60 Hz and converted to the standard RS 170 composite video signals. Processor 22 digitizes the video data using eight-bit bytes via A/D converter 55 and stores the digital pixel data in memory 52 of 480×512 bytes.

Upon demand, the CPU 23 moves the pixel data from memory 52 to minicomputer 30 via the data bus 32. The image processor 22 continuously converts the contents of the memory to analog video signals for the monitor 26. Generator 61 maps the intensity value of each pixel to a programmable color scale in red, green and blue to generate a pseudo-color grey scale of the original laser pulse image. The operator selects the program options of the processor 22 through the minicomputer 30 to provide the programmable color scale.

The programmable features of video processor 22 include:
(1) Setting the scaling for the pseudo-color intensity display;
(2) Superimposing patterns on the video screen with the image data;
(3) Summing sequential frames of scaled image data;
(4) Grabbing and holding a single frame of data; and
(5) Moving pixel data to or from the minicomputer.

All video signal operations are timed from the camera 20 since it is easier in most cases to trigger the laser 12 rather than triggering the scan cycle of the camera. The processor 22 synchronizes to the vertical blanking pulses of the video signal on path 24. Operating asynchronously with the video signal processing, the DMA port 56 on the processor 30 transfers commands and data between the processor 22 and the minicomputer 30.

Typically, a Q-switched laser pulse has a pulse-width that is ten nanoseconds long. To capture the beam profile with a video system necessitates synchronizing the laser pulse to the video scan. The CCD array camera 20 simplifies the process because the odd and even video fields are alternatively transferred out at the 30 Hz frame rate. Thus, the exposure time for each field is 33.3 ms. Moreover, the extreme intensity of the laser beam exceeds by many orders of magnitude the ambient background from the room lighting thus the background will not contribute to the video signal. Therefore, the laser pulse can occur at any time within the field except at the time of transfer from the photo sensors to the vertical clocking registers located in the CCD array of camera 20.

FIG. 3(a) and 3(b) describe two complementary techniques for phase-lock synchronizing low pulse rate lasers to the video scan or the camera scan to the laser. Both sync systems are designed to operate at 5, 10, 15, 20, and 30 Hz. FIG. 3(a) illustrates a simple phase-locked circuit for synchronizing a video camera to a free running laser operating at a pulse rate equal to or less than 30 Hz which is the maximum scan rate of the camera 20. This technique syncs the 14,32 MHz clock 70 to the laser's own internal clock. For example a 10 Hz laser trigger pulse from laser 12 on path 48 is coupled to amplifier 60. The divided outputs of amplifier 60 are coupled to variable delays 62 and 64 (delay variable from 0-60 ms). The output line 46 from delay 62 is the sync signal which is used as a gating signal to trigger minicomputer 30 via bus 68 (FIG. 2). This is needed to cause the minicomputer 30 to store a complete frame. The 60 Hz vertical retrace signal from camera 20 on path 73 is coupled to frequency divider 65 which divides the sync down to 10 Hz; the two 10 Hz signals are then compared in phase comparator 88. Variable delay 64 is manually adjusted until the two input signals to comparator 88 are in-phase synchronization. The output of comparator 88 adjusts the phase and synchronizes the 14 MHz clock 70 driving camera 20 via path 50.

FIG. 3(b) shows a simple procedure for synchronizing, for example, a 20 Hz laser from the 60 Hz vertical blanking pulse. In particular, the 60 Hz vertical retrace output signal from camera 20 is coupled via path 73 to frequency divider 72 (divide by 3) which provides a 20

Hz output signal to (0–60 ms) variable delays 74 and 76. The output of delay 74 is used as the 20 Hz laser trigger and applied to laser 12 via path 75 and the output of delay 76 is used as the gate signal on path 46 (FIG. 2) to trigger minicomputer 30. by observing the image of the laser pulse on the color monitor 26, the variable delay circuit 74 is adjusted until the two video camera fields are properly superimposed and stable in that position.

Figure 3:
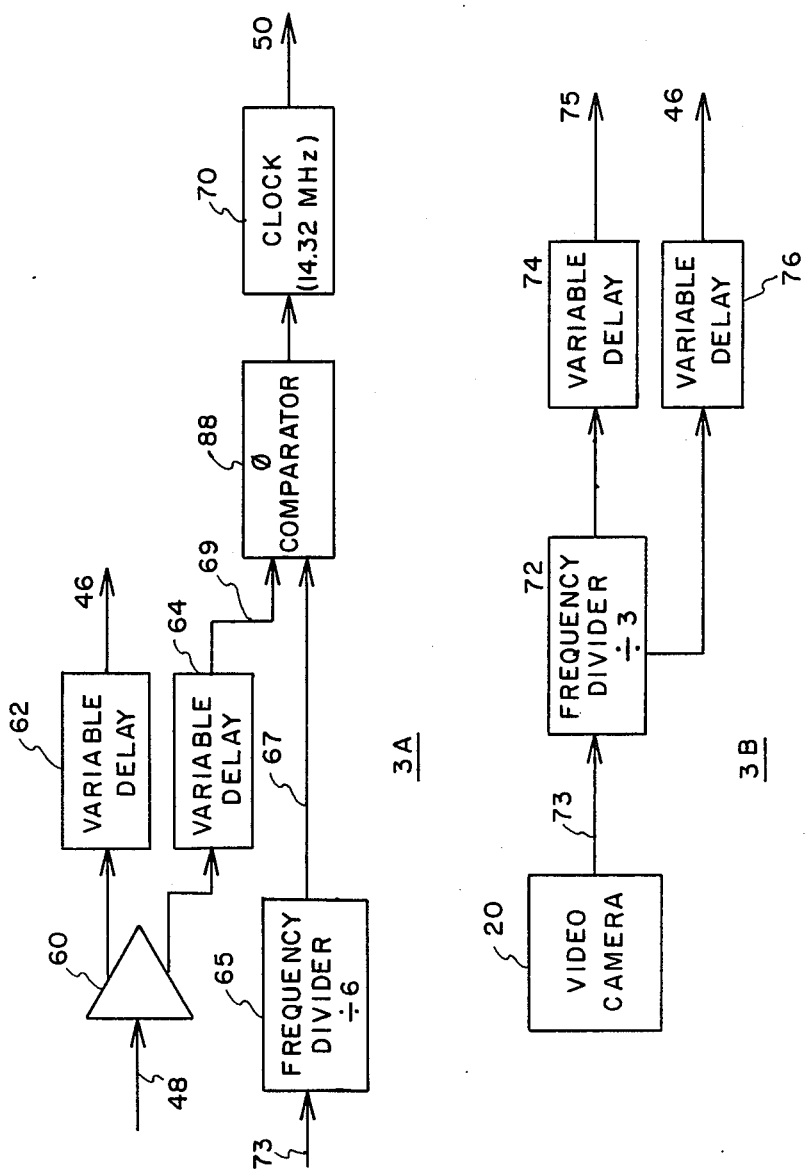
FIG. 3($a$)-3($b$) shows two techniques for phase locked synchronizing low pulse rate lasers to the video scan.

The next step in the synchronizing process is to match the timing of the video processor 22 to that of the laser 12 so that the image on the monitor 26 appears steady and only changes with each new pulse of light. For this, the second trigger pulse on path 46 in FIG. 3 is sent to the minicomputer 30 via bus 68. Minicomputer 30 is programmed, as shown in the flow chart of FIG. 4, to issue a single frame 'grab' when the frame contains an image of the laser flash, (the reading and processing of pixel data being in synchronization with the camera 20 raster scan as described above).

This procedure produces a quasi-static display on the monitor 26 of the pulsed laser beam energy distribution which is updated at the pulse repetition rate of the laser. Moreover, frame data can be transferred from the processor 22 to minicomputer 30 through the DMA (direct memory access) port 56 in synchronization with the laser pulse. Using the embodiment shown in FIG. 1 and the equipment specified, the data transfer and any subsequent processing takes a minimum of half a second and may require several tens of seconds depending upon the processing involved; in the meantime the beam image remains frozen on the monitors. Typically the laser beam pulses uniformly at a subharmonic of the 60 Hz video field repetition rate. Laser repetition rates of 5, 10, 20, 30 and 60 Hz may be programmed into this system as a convenience to the user. This system neither pulses the laser 12 nor reads the video frame data asynchronously with the video scanning.

Ancillary measurements of a laser system 12 may be performed through other I/O interfaces on minicomputer 30. The Programmable Clock 80 within minicomputer 30 provides a means for timing external signals which could be use for timing the pulse repetition rate of the laser. This clock has frequency rates of 0.1, 1, 10, 100 and 1000 kHz selectable from the from the computer program. Triggering the clock with the laser pulse transfers the clock count into a register which can be used to calculate the time interval between pulses from which the repetition rate can be calculated. This arrangement is utilized to analyze the modulation characteristics of the pulsed laser and the scanning rates for an optical scanner.

An important parameter to measure with respect to a pulsed laser beam is the pulse-to-pulse energy stability. To accomplish this the 12 bit analog-to-digital converter 82 is used to sample the beam on a pulse-to-pulse basis to measure its energy stability. When the beam energy is sampled with a fast photodiode (FPD) 15, its output pulse coming over line 41 is digitized (by converter 82) and statistically analyzed by CPU 33 for its energy stability. (FPD 15 could be implemented with a Hewlet-Packard type 5082 or equivalent.) For example, assuming a gaussian distribution for the pulsed energy output, a standard deviation of two percent of the expectation implies that only one pulse in 10,000 has an energy that is more than six percent less than its expectation value.

A hard disk drive 84 may be provided for storage in addition to the memory provided by the 512k RAM 86.

An I/O port 90 is also provided as shown in FIG. 2 and is connected for illustrative purposes, to printer 42 and terminal 96. The video processor 22 is controlled by minicomputer 30 such that a red-green-blue psuedo-color grey scale produced by generator 61 in the video display 26 represents the intensity of the laser beam.

Figure 4:
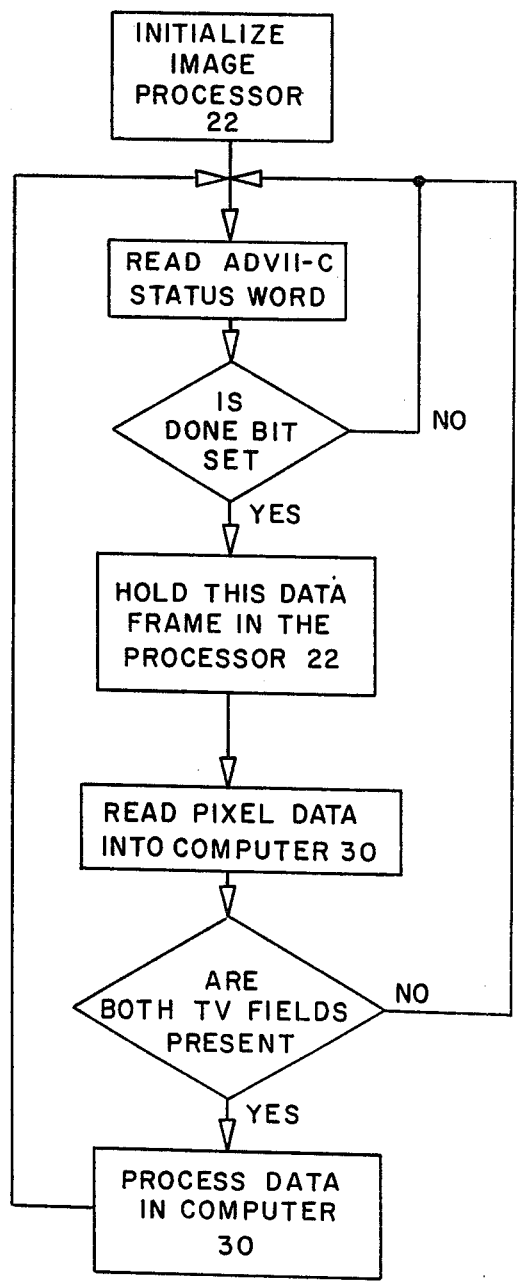
FIG. 4 is a flow chart for reading and processing pixel data in synchronization with the video camera scan rate.

FIG. 4 shows the basic program flow for reading and processing pixel data in synchronization with the video camera 20. The minicomputer 30 initializes and puts the image processor 22 into operation by issuing a sequence of commands to it over the data link 32. When the camera 20 operates in synchronization with the laser 12, a sync signal is also sent to the minicomputer 30 via the data link 46. This sync signal actually sets the "DONE" bit in the 12 bit A/D Converter 82 which the computer program tests as shown in FIG. 4. When the "DONE" bit is set that tells the minicomputer 30 that the video image currently in the video processor 22 contains an image of the laser beam 10. Following through the process shown in FIG. 4, the minicomputer 30 commands the video processor 22 via the data link 24 to hold and display this image until the minicomputer 30 isues another hold and display command. Next, the minicomputer 30 issues a command which causes the digitized image data to be transferred from the image processor 22 to the RAM memory 86 in minicomputer 30. Because the complete video image consists of two interlaced video fields, the CPU 33 tests for the presence of image data in both fields. If both fields are not present the CPU 33 discards the data and looks for another image to hold and process. In this way the computer vertifies that the laser 12 synchronizes properly with the video camera 20.

While the invention has been described with reference to its preferred embodiments, it will be understood by those skilled in the art that various changes may be made and equivalents may be substituted for elements thereof without departing from the true spirit and scope of the invention. In addition, many modifications may be made to adapt a particular situation or material to the teaching of the invention without departing from its essential teachings. For example, the beam optics 14 and transmission screen 16 are not essential to proper operation of the system. If the beam is carefully aligned into the camera aperature with the camera lens removed, the optics and image screen may be eliminated.

What is claimed is:

1. A system for analyzing the energy profile of a pulsed laser beam comprising:
    means for providing a two-dimensional image of each pulse of said laser beam;
    video scanning means for scanning successive lines of said image and for generating a time-varying output signal having an amplitude characteristic proportional to the intensity of light of each scanned line;
    means for digitizing said output signal and for storing the digital data representing at least one complete pulsed laser image;
    processing means for processing said digital data and determining the energy level of each pulse image corresponding to said digital signal; and
    means for synchronizing the image of said pulsed laser beam to said scanning means whereby said laser pulses are provided at the initiation of said video scanning means.

2. The system of claim 1 wherein the video scanning rate of said scnning means and the pulse rate of said pulsed laser beam are such that each pulse image is processed by said computer means.

3. The system of claim 1 wherein the image of each pulse is formed on a transmission screen.

4. The system of claim 1 wherein said computer means controls a pseudo color gray scale converter whereby a signal comprising a plurality of colors represents the intensity of each pulse image over its scanned dimensions.

5. The system of claim 4 wherein said color signal represents the energy profile of each pulse image.

6. The system of claim 5 wherein said color signal is coupled to a monitor for viewing.

7. The system of claim 1 wherein said two dimensional scan provides an array of 488×380 pixels for each pulse image produced by the corresponding laser pulse.

8. The system of claim 7 further including an analog-to-digital converter coupled to said processing means.

9. The system of claim 8 wherein said image processing means stores the output of said analog-to-digital converter as data in a memory device.

10. The system of claim 9 wherein said computer means analyzes the data stored in said memory device.

11. The system of claim 1 wherein each laser beam provided by the corresponding pulse image is scanned and analyzed separately.

12. A system for analyzing the energy profile of a pulsed laser beam comprisng:
   means for providing a two-dimensional image of each pulse of said laser beam;
   video scanning means for scanning successive lines of said image and for generating a time-varying output signal having an amplitude characteristic proportional to the intensity of light of each scanned line;
   means for digitizing said output signal and for storing the digital data representing at least one complete pulsed laser image;
   processing means for processing said digital data and determining the energy level of each pulse image corresponding to said digital signal; and
   means for synchronizing said scanning means to said pulsed laser beam image.

* * * * *